United States Patent
Vogel et al.

(10) Patent No.: US 9,815,506 B2
(45) Date of Patent: Nov. 14, 2017

(54) AERODYNAMIC ATTACHMENT FOR UNDERBODY STORAGE BOXES

(71) Applicant: Aero Industries, Inc., Indianapolis, IN (US)

(72) Inventors: John Vogel, Columbus, IN (US); Ryan Reeder, Carmel, IN (US)

(73) Assignee: Aero Industries, Inc., Indianapolis, IN (US)

(*) Notice: Subject to any disclaimer, the term of this patent is extended or adjusted under 35 U.S.C. 154(b) by 0 days.

(21) Appl. No.: 15/185,805

(22) Filed: Jun. 17, 2016

(65) Prior Publication Data

US 2016/0368545 A1 Dec. 22, 2016

Related U.S. Application Data

(60) Provisional application No. 62/181,810, filed on Jun. 19, 2015.

(51) Int. Cl.
| | | |
|---|---|---|
| *B62D 35/00* | (2006.01) | |
| *B60R 9/02* | (2006.01) | |
| *B62D 35/02* | (2006.01) | |

(52) U.S. Cl.
CPC .............. *B62D 35/001* (2013.01); *B60R 9/02* (2013.01); *B62D 35/02* (2013.01); *Y02T 10/88* (2013.01)

(58) Field of Classification Search
CPC ........ B62D 25/002; B62D 35/001; B60R 9/02

USPC ......... 296/37.6, 37.1, 180.4, 181.5
See application file for complete search history.

(56) References Cited

U.S. PATENT DOCUMENTS

| | | | | |
|---|---|---|---|---|
| 2009/0189414 A1* | 7/2009 | Boivin | ................ | B62D 35/001 296/180.4 |
| 2012/0313348 A1* | 12/2012 | Pfaff | ................... | B62D 35/001 280/423.1 |
| 2014/0125088 A1* | 5/2014 | Wiegel | ................ | B62D 35/001 296/180.4 |
| 2014/0265436 A1* | 9/2014 | Maiorana | ............. | B62D 35/001 296/180.4 |
| 2017/0129549 A1* | 5/2017 | Polgrean | .............. | B62D 35/001 |

* cited by examiner

*Primary Examiner* — Jason S Morrow
(74) *Attorney, Agent, or Firm* — Maginot, Moore & Beck, LLP

(57) ABSTRACT

An underbody storage box assembly mountable beneath a vehicle body includes a storage box mountable to the underbody of the vehicle body, the storage box having a leading face and a trailing face in the direction of travel of the vehicle. The assembly is provided with a pair of like-configured aerodynamic caps, one mounted at the leading face of the storage box and the other mounted at the trailing face of the storage box. Each of the aerodynamic caps includes opposite side panels, each having a substantially triangular shape with a rear edge abutting the storage box, a base edge that is substantially perpendicular to the rear edge, and a front edge that is arranged at an acute angle relative to the base edge. A front panel is connected between the opposite side panels at the front edge.

31 Claims, 19 Drawing Sheets

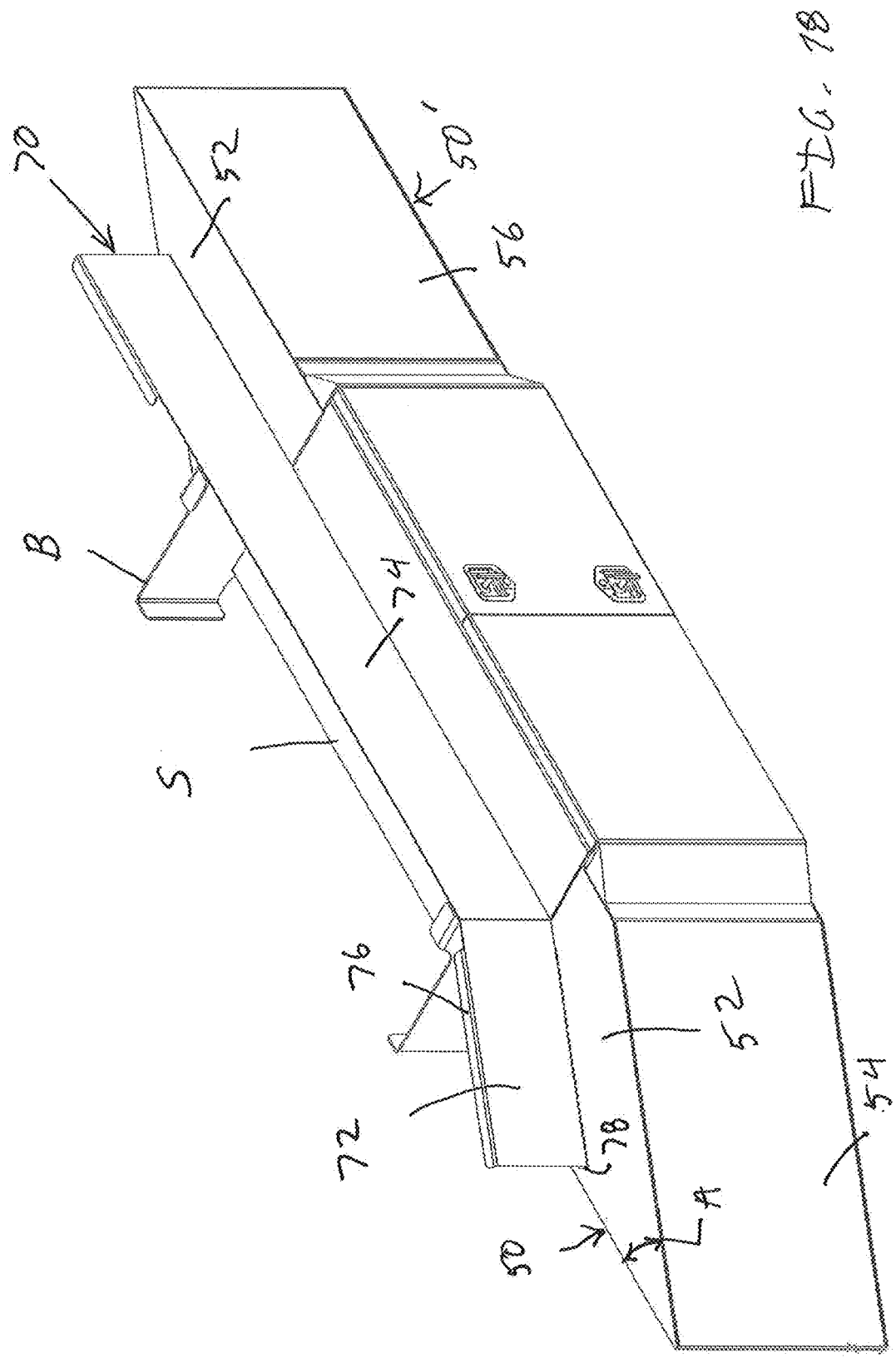

AERODYNAMIC ATTACHMENT FOR UNDERBODY STORAGE BOXES

REFERENCE TO RELATED APPLICATION AND PRIORITY CLAIM

This application is a utility filing from and claims priority to U.S. provisional application No. 62/181,810, filed on Jun. 19, 2015, the entire disclosure of which is incorporated herein by reference.

BACKGROUND

The present disclosure relates to drag reduction devices for land vehicles, such as trucks and tractor-trailer rigs.

Fuel economy is a persistent concern for all land vehicles and is particularly acute for large vehicles such as trucks and tractor-trailer rigs. Fuel economy improvements have been achieved by innovation in engine design and improvements in fuel composition. However, the size and shape of the vehicles plays a substantial role in fuel economy. Ultimately, drag is the greatest enemy to fuel economy, with as much as 70% of the engine power devoted to cutting through the air in front of the vehicle.

Drag is a force that resists the movement of a body through a fluid, whether the body is a baseball and the fluid is air, or the body is a swimmer moving through water. Drag is a function of two components—friction drag and pressure drag. Friction drag is a force that acts tangential to a surface of the body. Friction drag is increased by irregularities or roughness on the surface and decreased by making the surface more slippery. A clean truck cuts through the air more efficiently and with less friction drag than a dirty truck.

Pressure drag is a force that acts perpendicular to a surface. Pressure drag is a function of the surface area in the direction of travel as well as the velocity or speed at which the body is traveling. Pressure drag increases as the square of velocity so that doubling vehicle speed actually creates four times more pressure drag. On the other hand, pressure drag is directly related to surface area so that a ten percent reduction in surface area leads to a ten percent decrease in pressure drag.

For aerodynamically configured vehicles, such as airplanes, friction drag contributes more heavily to overall drag than pressure drag. However, for land vehicles, such as a typical tractor-trailer, pressure drag can be as much as ten times greater than friction drag due to the large frontal surface area of the truck. Unfortunately, the size of these types of vehicles is dictated by their function—hauling products or materials. Unlike passenger vehicles, the box-like shape of trucks cannot be significantly altered. A smaller frontal surface area means a smaller truck which means less cargo that can be hauled. Pressure drag in land vehicles, and especially in trucks, is increased by pressure "hot spots", such as beneath the undercarriage, behind the rear of the trailer or between the tractor and the trailer. These hot spots are generally regions of low pressure which causes air flowing over the vehicle to deviate from a streamlined path around the vehicle. Vortices can form in these hot spots that significantly increase the pressure drag.

In quantitative terms, if a square body has a drag coefficient ($C_D$) of 1.00, elongating the body into a rectangular shape reduces $C_D$ to 0.80. Adding a rounded nose cuts the coefficient in half to 0.40. Adding a "boat tail" or a conical tail decreases $C_D$ further to 0.20. It has been estimated that a 20% reduction in drag yields at least a 10% increase in fuel economy at highway speeds. For truckers and trucking companies, this increase in fuel economy means significantly reduced fuel costs year in and year out. For the environment, increases in fuel economy mean fewer deleterious emissions. A significant amount of effort has been expended in developing drag reduction technology for trucks. These efforts include streamlining the tractor, introducing seals, air deflectors or vortex generators in the gap between the tractor and trailer, and adding undercarriage skirts, guide vanes, air deflectors and boat tails to the trailer. Each of these modifications contributes in some measure to the overall drag reduction, so a fully optimized rig will incorporate a number of these improvements.

However, all of these efforts have been directed to the tractor or trailer itself, and not to accessories associated with the vehicle. One common accessory is the underbody storage box, an example of which is depicted in FIG. 1. The storage box S is mounted to the frame F of the trailer T, either in front of the rear wheels W or in some cases between tandem rear wheels. The typical underbody storage box is 24 in. tall, 24 in. deep and 60 in. long. Not only does the square face of the storage box increase the overall pressure drag of the trailer, the storage box can also increase the turbulence of the airflow beneath the trailer. Not only does this increased turbulence add to the drag, it can also lead to increased road spray lateral to the trailer when traveling on wet or slushy roads.

Consequently, there is a need for making the underbody storage box more aerodynamic to reduce the impact of the storage box on the overall drag of a trailer.

SUMMARY

An underbody storage box assembly mountable beneath a vehicle body includes a storage box mountable to the underbody of the vehicle body, the storage box having a leading face and a trailing face in the direction of travel of the vehicle. The assembly is provided with a pair of like-configured aerodynamic caps, one mounted at the leading face of the storage box and the other mounted at the trailing face of the storage box. Each of the aerodynamic caps includes opposite side panels, each having a substantially triangular shape with a rear edge abutting the storage box, a base edge that is substantially perpendicular to the rear edge, and a front edge that is arranged at an acute angle relative to the base edge. A front panel is connected between the opposite side panels at the front edge.

An aerodynamic cap is provided for mounting to an existing underbody storage box, in which the cap includes opposite side panels, each having a substantially triangular shape with a rear edge abutting the storage box, a base edge that is substantially perpendicular to the rear edge, and a front edge that is arranged at an acute angle relative to the base edge. A front panel is connected between the opposite side panels at the front edge.

DESCRIPTION OF THE FIGURES

FIG. 18 is a perspective view of the storage box and aerodynamic caps shown in FIG. 14, with an additional fairing mounted thereto according to a further embodiment.

DETAILED DESCRIPTION

Figure 1:
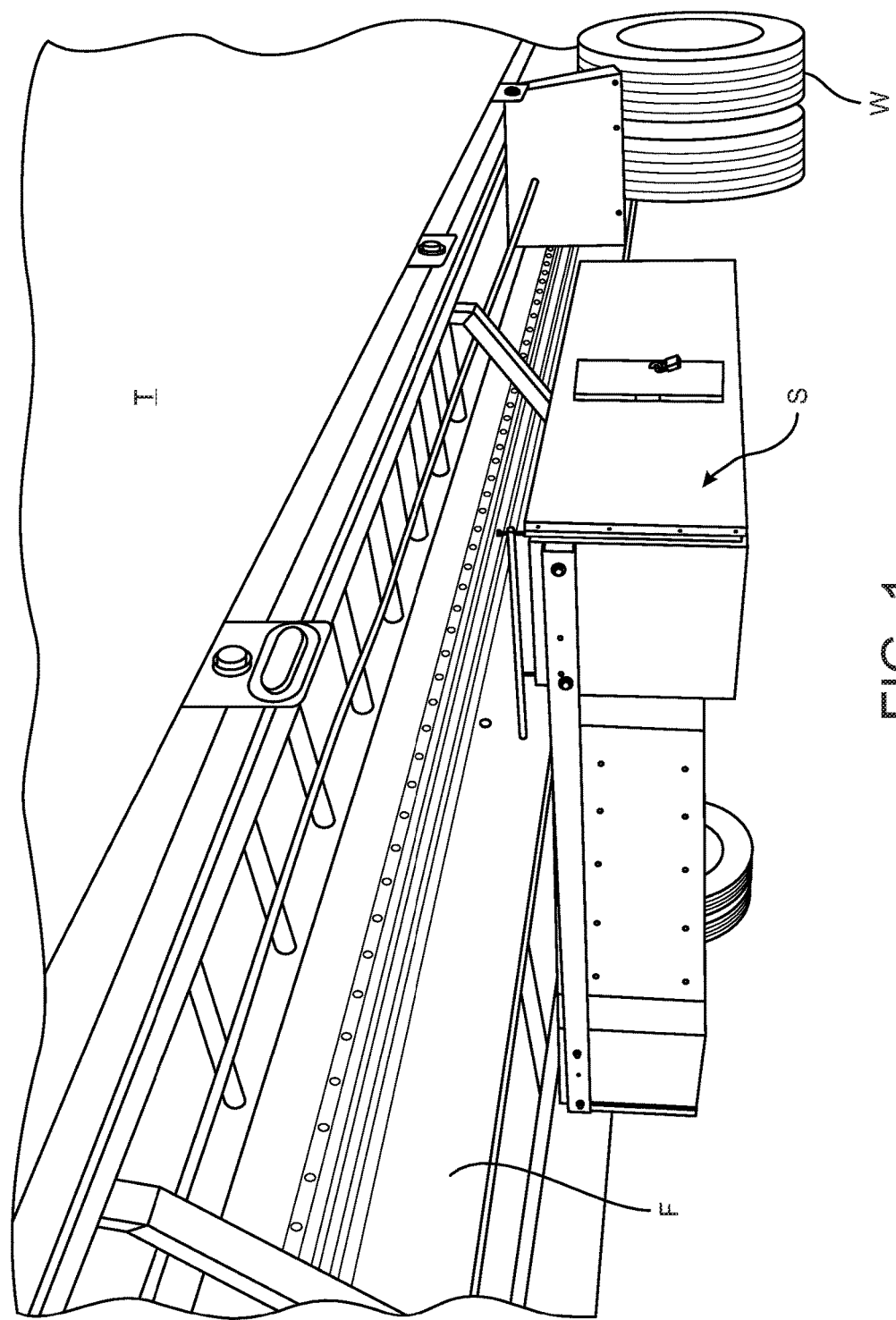
FIG. 1 is a perspective view of a portion of a trailer showing an underbody storage box mounted thereto.
Figure 2:
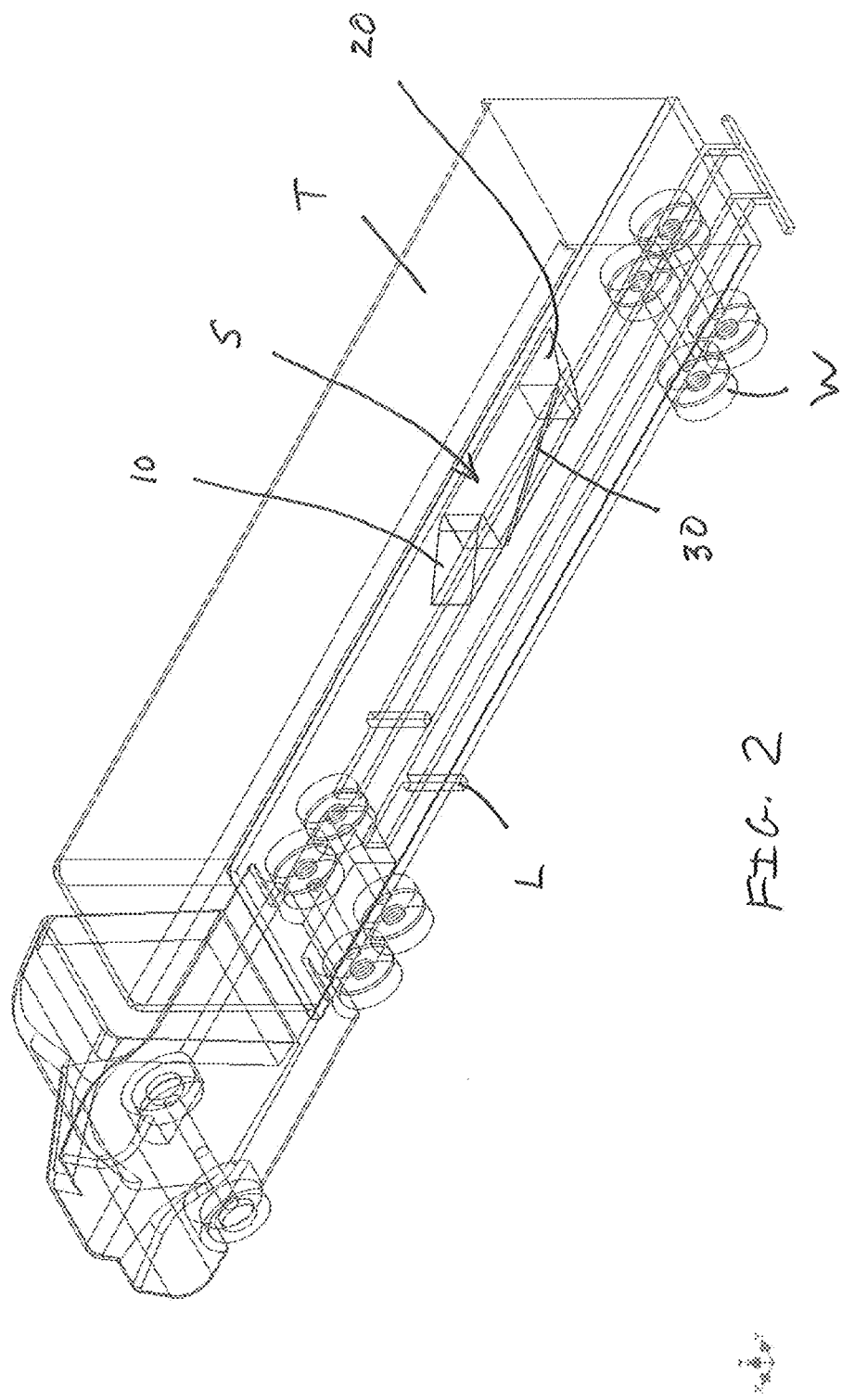
FIG. 2 is a bottom wire view of a tractor-trailer with an underbody storage box and incorporating the aerodynamic features according to one aspect of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

A trailer T includes an underbody storage box S mounted to the frame of the trailer forward of the trailer wheels W, as is common in the trucking industry. The storage box S may be of any dimension, such as 24" high by 24" deep by 60" long. In one aspect of the present disclosure, aerodynamic features are added to the storage box to reduce the drag effect of the box, as illustrated in FIGS. 2-5. In particular, a leading cap 10, trailing cap 20 and strake 30 are affixed to the storage box S. As best shown in the enlarged view of FIG. 4, a cap 10 is affixed to the front face 50 of the box S, a second cap 20 is affixed to the rear face 51 of the box and the strake 30 is affixed to the bottom surface 52 of the box.

Figure 5:
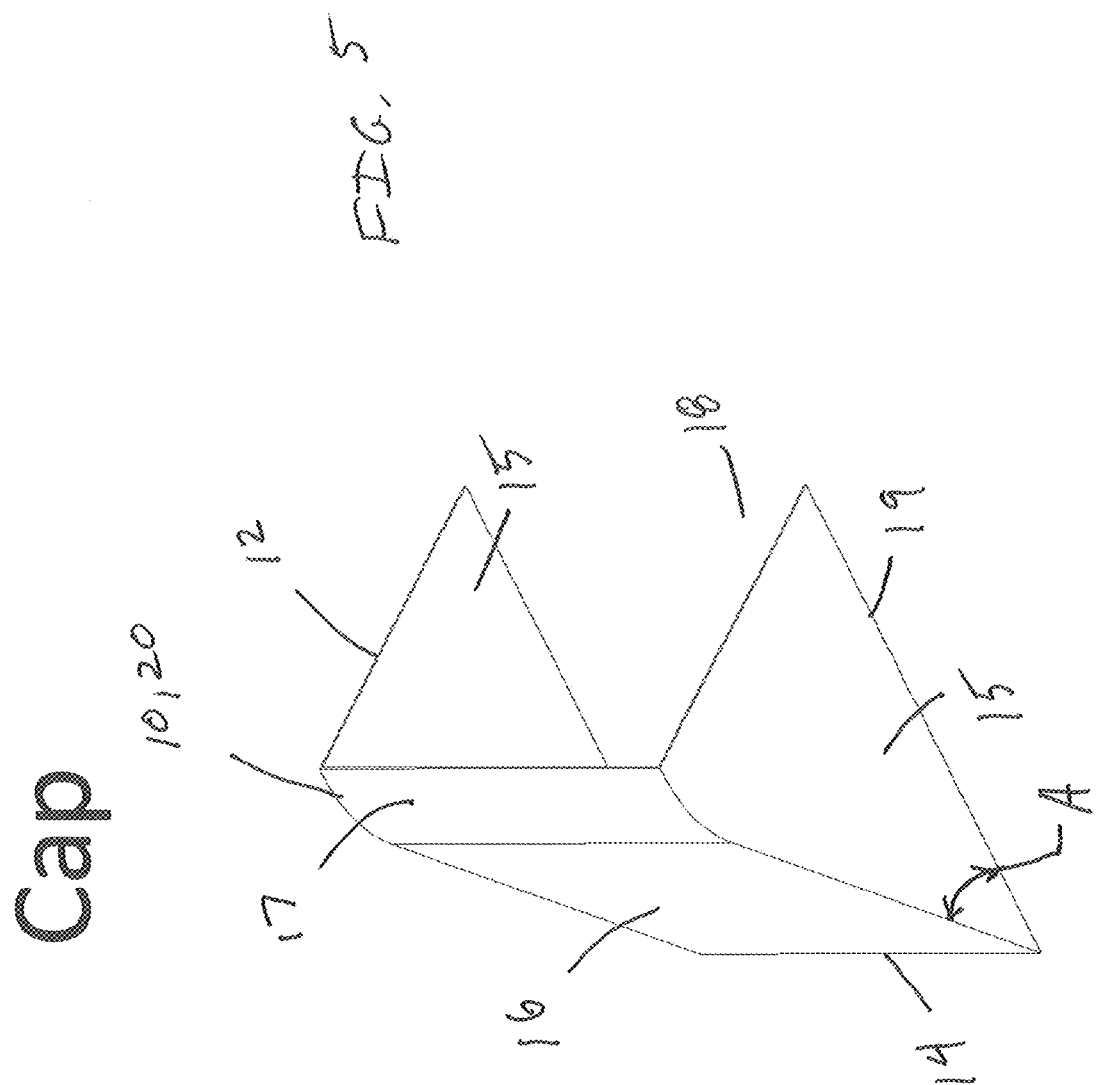
FIG. 5 is an enlarged perspective view of an aerodynamic cap shown in FIGS. 2-4.

In one feature, the front and rear caps 10, 20 can have the same construction, namely the construction shown in FIG. 5. The caps include a leading edge 14 and a trailing edge 12. The leading edge 14 is linear while the trailing edge is in a U-shape that corresponds to the height and depth dimensions of the storage box S. The caps 10, 20 include a front panel 16 extending from the leading edge 14 to a transition panel 17. Side panels 15 support the front panel and the transition panel and cooperate with the panels to define an interior space 18. The side panels 15 are generally right triangular in shape, with the trailing edge 12 forming a 90° angle with the bottom edge 19 of the cap. The front panel forms an angle A with the bottom edge 19, which angle can range from 20-60 degrees. In one embodiment, the angle A is about 35° which has been found to provide a smooth, non-turbulent transition for air flow across the caps 10, 20.

Figure 4:
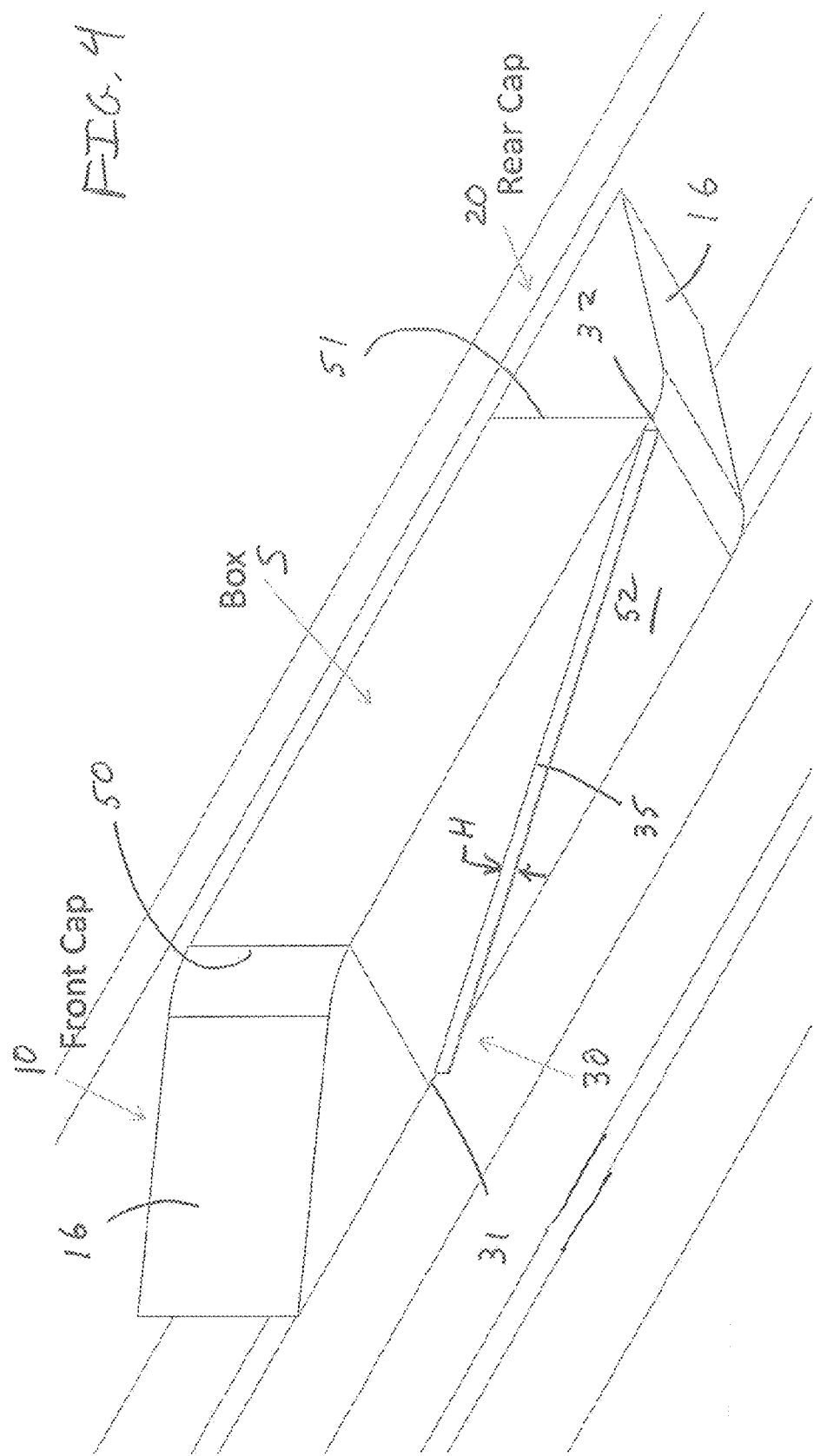
FIG. 4 is an enlarged perspective view of the underbody storage box shown in FIGS. 1-2 incorporating the aerodynamic features disclosed herein.

The side panels have a height corresponding to the depth of the storage box for the front cap 10 and corresponding to the height of the storage box for the rear cap 20. As shown in FIG. 4, the front cap 10 is oriented 90° offset relative to the rear cap 20. In particular, the front panel 16 of the front cap 10 faces laterally outward relative to the trailer T, while the front panel of the rear cap 20 faces downward relative to the trailer. It has been found that this arrangement of the front cap assures a smooth transition of airflow around the storage box. This arrangement of the rear cap has been found to reduce turbulence of airflow exiting the storage box. For the typical storage box, the height and depth are the same. Consequently, the same cap can be used at the front and rear of the storage box, with the cap oriented accordingly. Thus, in the illustrated embodiment, the leading edge 14 has a length of 24 in. and the side walls 15 have a height of 24 in. For a cap having an angle A of about 35° the bottom edge 19 has a length of about 39 in. The transition panel 17 is formed at a smooth radius to transition from the front panel 16 to the trailing edge 12. In one embodiment, the transition panel is formed at a radius of about 39 in.

It can be appreciated that for storage boxes having a rectangular face the height and width dimensions of the front cap 10 will vary from the rear cap 20. Thus, for a box S that has a depth of 30 in., the height of the side walls for the front cap will equal that depth, while the width of the leading edge of the rear cap will equal the box depth.

In a further aerodynamic feature of the present disclosure, a strake 35 is affixed to the bottom face 52 of the storage box S. The strake 35 is in the form of a thin rigid strip 35 projecting at a height H from the bottom face 52. In one embodiment, an optimum height H for the strip is about 2 in. The strip 35 extends from the inboard forward corner 31 of the box to the outboard rearward corner 32. The strake is thus oriented to direct airflow at the boundary layer of the storage box S laterally outward from the trailer T. For a typical 24×24×60 storage box, the strake will have a length of about 65 in.

Figure 3:
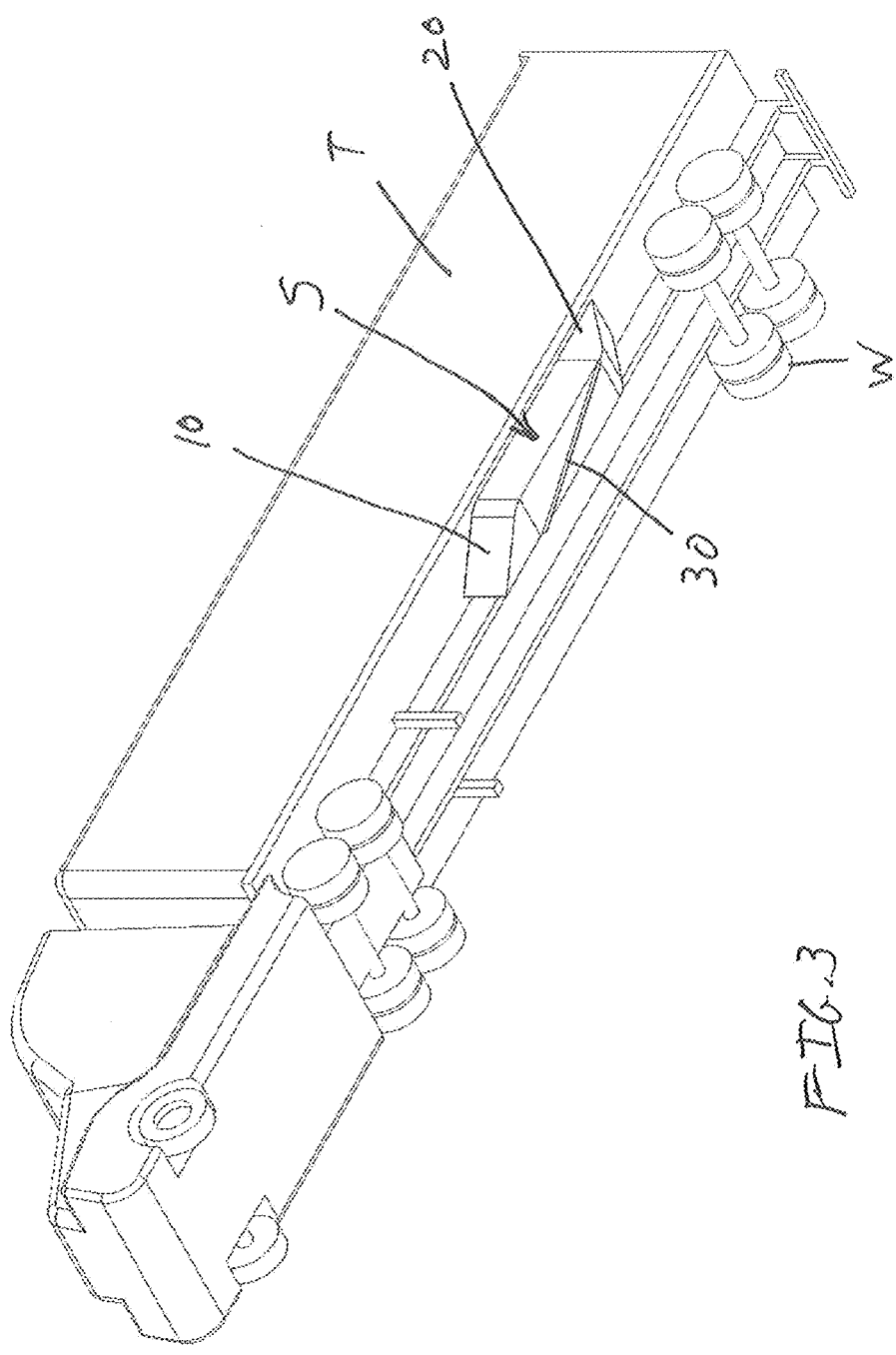
FIG. 3 is a further bottom perspective view of a tractor-trailer with an underbody storage box and incorporating the aerodynamic features according to one aspect of the present disclosure.

The caps 10, 20 and the strake 30 can be formed of a metal similar to the metal of the storage box S, or may be formed from a plastic that is capable of withstanding the environment. Thus, in one embodiment these aerodynamic components can be formed of aluminum sheet. However, other suitably rigid materials may be used that is corrosion resistant and that can withstand the dynamic loads experienced underneath a trailer at highway speeds. The caps and strake may be affixed to the storage box in a known manner, such as by welding. The caps and strake may also incorporate flanges that can be riveted or otherwise fastened to the storage box. As a further alternative, at least the caps can be integrated into the box construction. The caps 10, 20, and particularly the front panel 16 may define a recess for receiving a polished or decorative insert plate. In one embodiment, the front plate 16 may incorporate a recessed perimeter into which the polished or decorative panel may be mounted. It is further contemplated that a side panel 15 may also incorporate a recessed perimeter to receive a correspondingly shaped insert, at least if the side panel is visible, as shown in FIG. 3.

Figure 6:
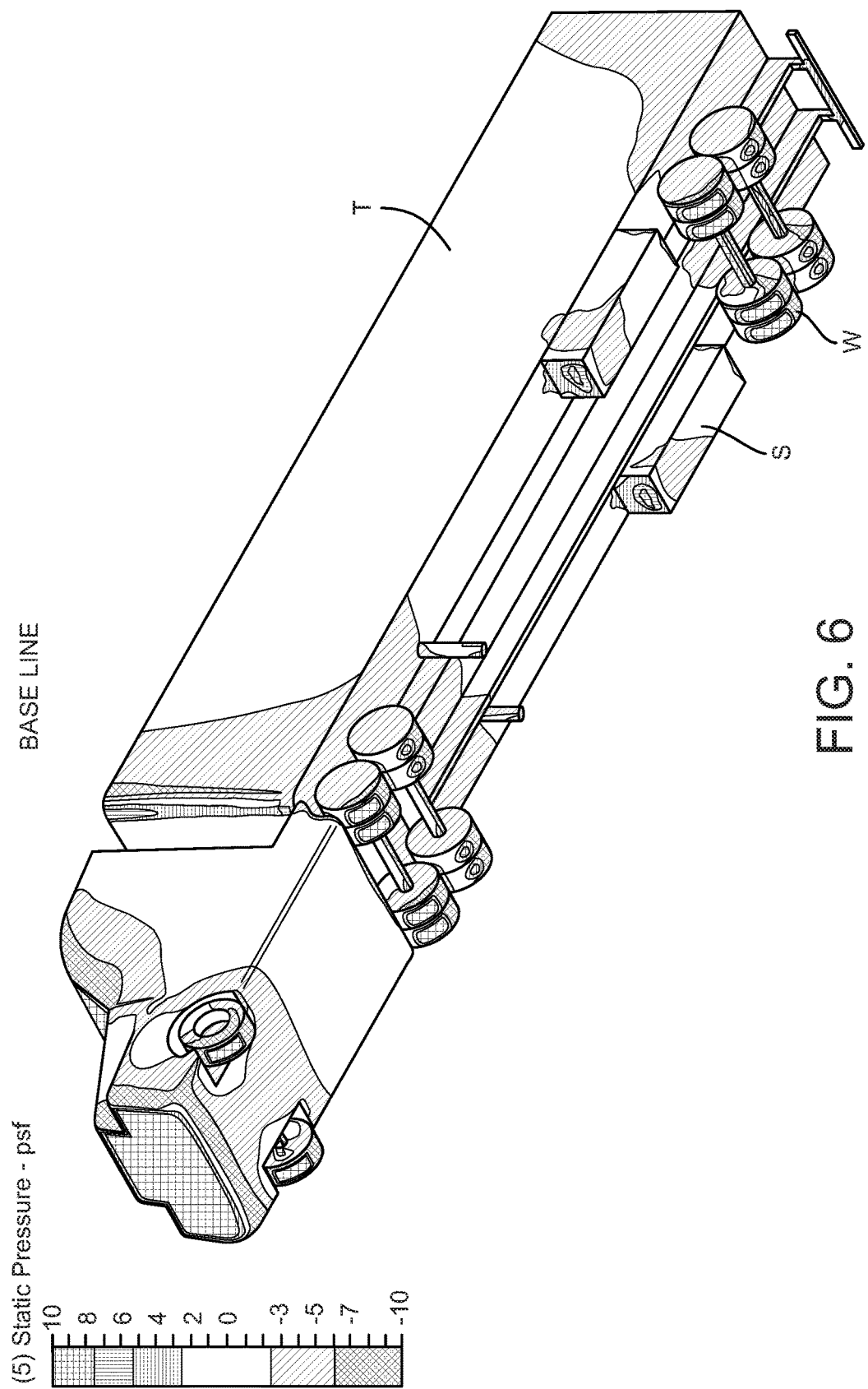
FIG. 6 is a three-dimensional model of a tractor trailer such as the tractor-trailer shown in FIGS. 2-4 including an underbody storage box, with a computational flow dynamics representation of static pressure indicative of pressure drag on the vehicle in a baseline condition without any of the aerodynamic features disclosed herein.
Figure 7:
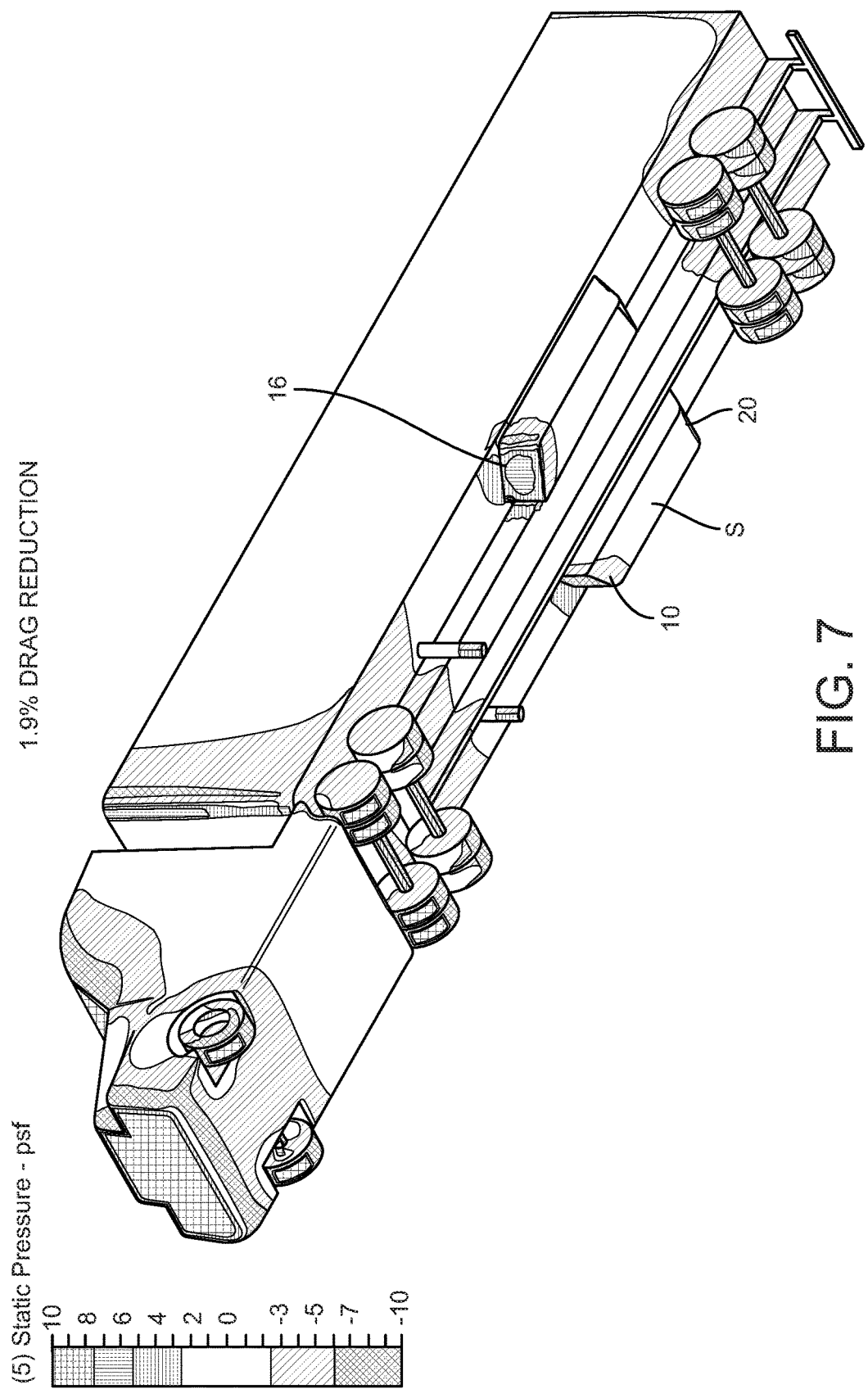
FIG. 7 is the three-dimensional CFD model of FIG. 6 with an aerodynamic cap of the present disclosure added to the storage box.

The drag reduction capabilities of the aerodynamic features disclosed herein can be seen by comparing the computational flow dynamics (CFD) simulations in FIGS. 6-11. The baseline static pressure experienced by the tractor-trailer is shown in FIG. 6. It can be seen that the static pressure, which is indicative of the magnitude of pressure drag, is the greatest at the front face of the storage box S and at the front of the wheels W. FIG. 7 shows the CFD model for a storage box with the front and rear caps 10, 20 added. It can be seen that the static pressure on the front face 16 of the front cap 10 is significantly less than in the baseline configuration. In addition, the static pressure is more uniform across the front face 16 than across the front face of the storage box in the baseline configuration. Moreover, the region of negative pressure across the side and bottom walls of the storage box is more pronounced with a greater negative pressure than for the baseline configuration. It can also be seen that the static pressure on the wheels is also slightly reduced from the baseline configuration. The reduction in static pressure attributable to the caps 10, 20 can be calculated to about a 1.9% reduction in drag.

Figure 8A:
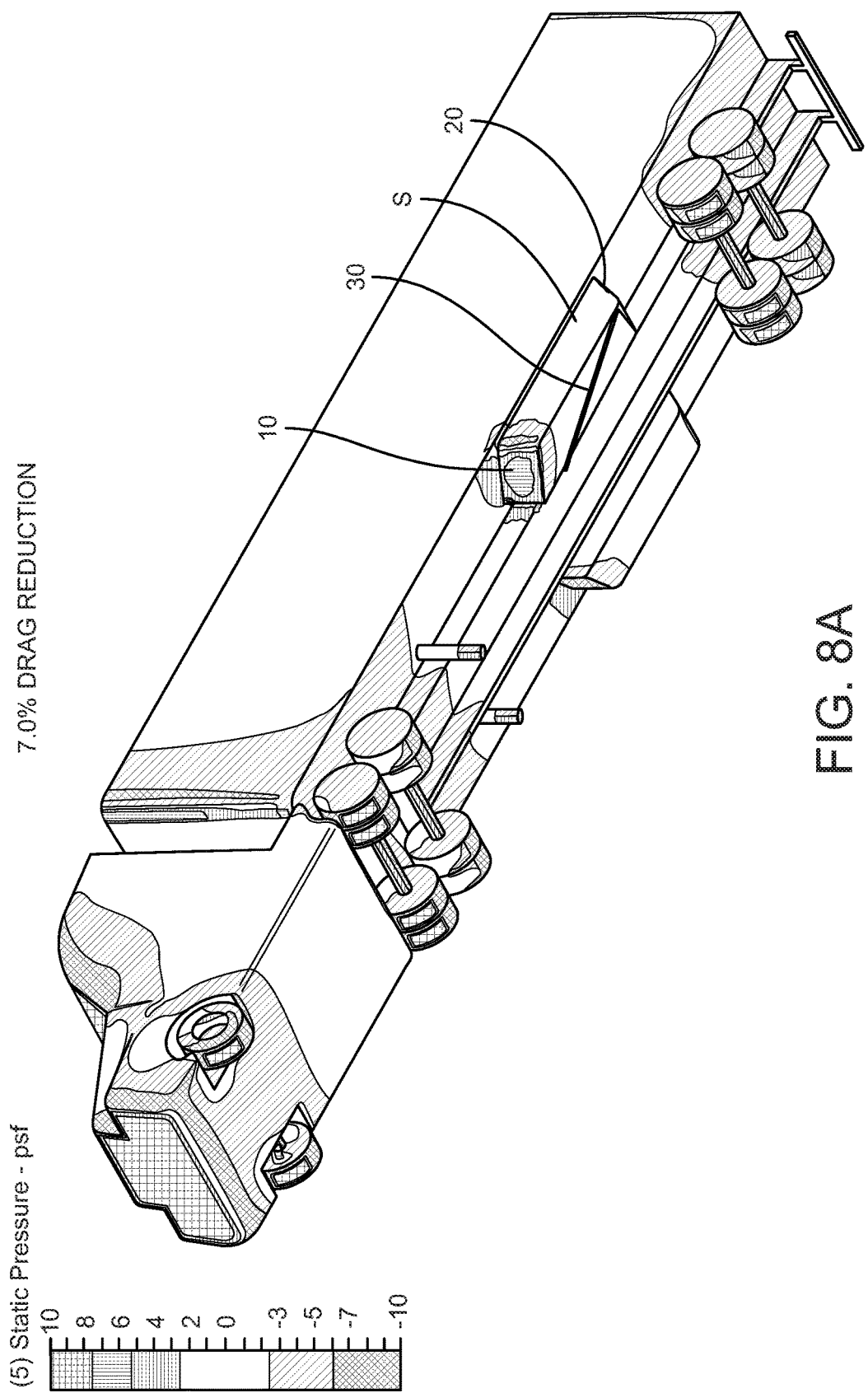
FIG. 8a is the three-dimensional CFD model of FIG. 6 with an aerodynamic cap and strake of the present disclosure added to the storage box.
Figure 8B:
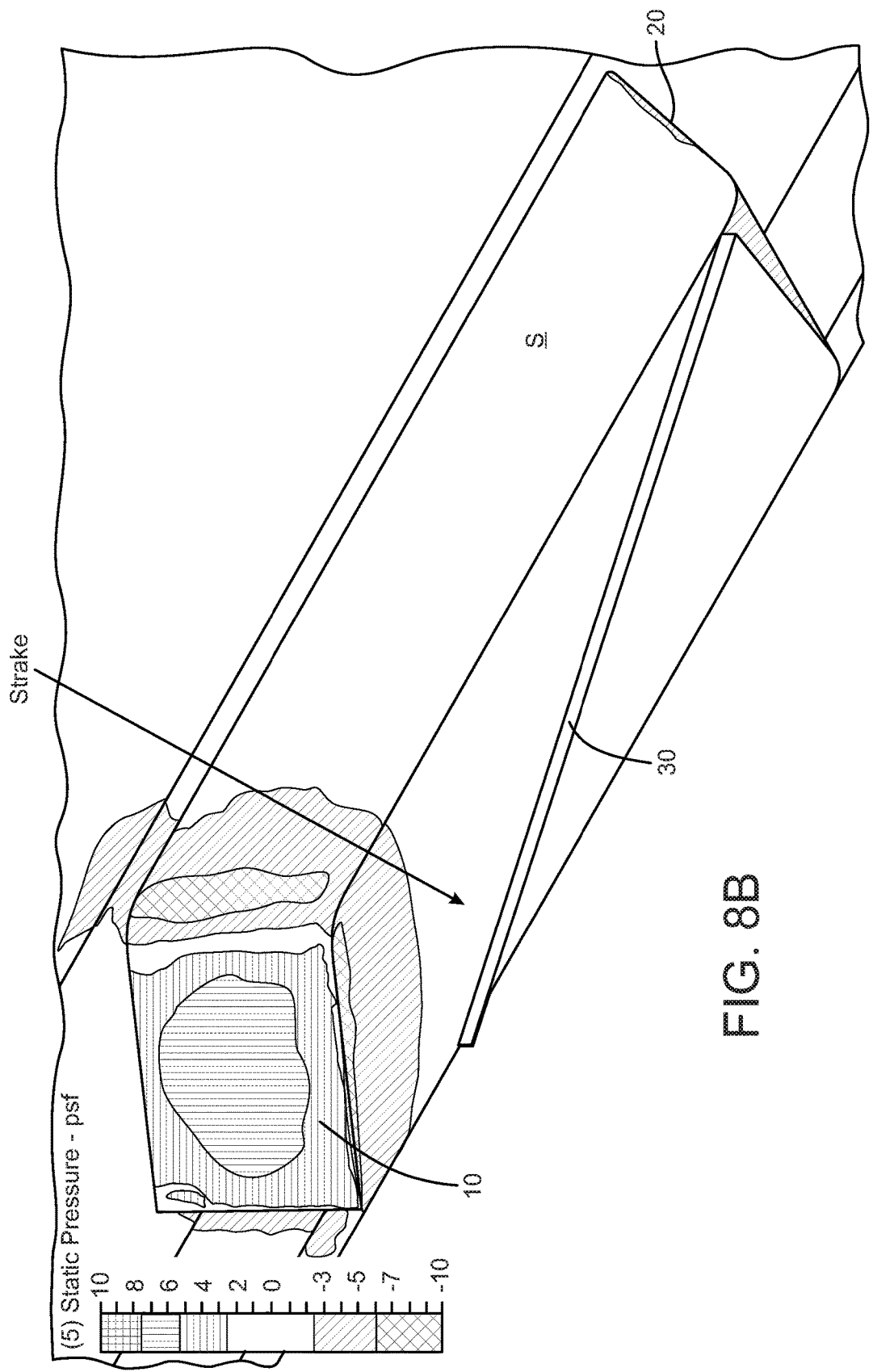
FIG. 8b is an enlargement of FIG. 8a centered on the storage box and aerodynamic features added to the box

FIGS. 8a, 8b show the CFD model for a storage box having the caps 10, 20 as well as the strake 40. The combination of these aerodynamic features on the storage box leads to a calculated 7% reduction in drag from the baseline configuration.

Figure 9:
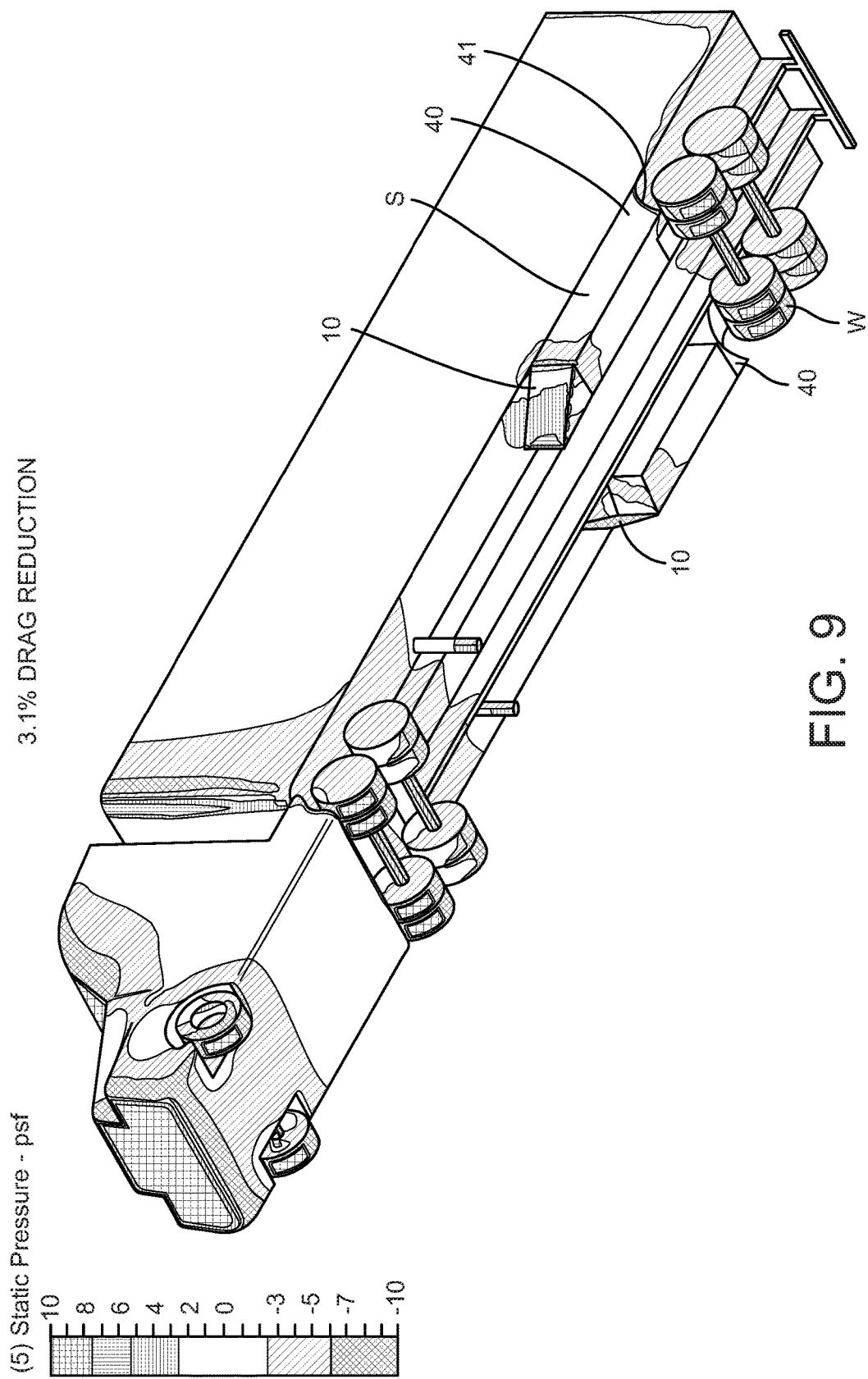
FIG. 9 is the three-dimensional CFD model of FIG. 6 with an aerodynamic cap and rear skin of the present disclosure added to the storage box.

In an alternative configuration, the rear cap may be replaced with a rear skin 40 that extends from the side wall of the storage box rearward toward the wheels W, as shown in FIG. 9. The rear skin may be an integral extension of the side wall of the storage box itself. The rear edge 41 of the skin may be closely disposed relative to the wheel with a cut-out for clearance for the wheel. This configuration yields a 3.1% reduction in drag from the baseline configuration.

Figure 10:
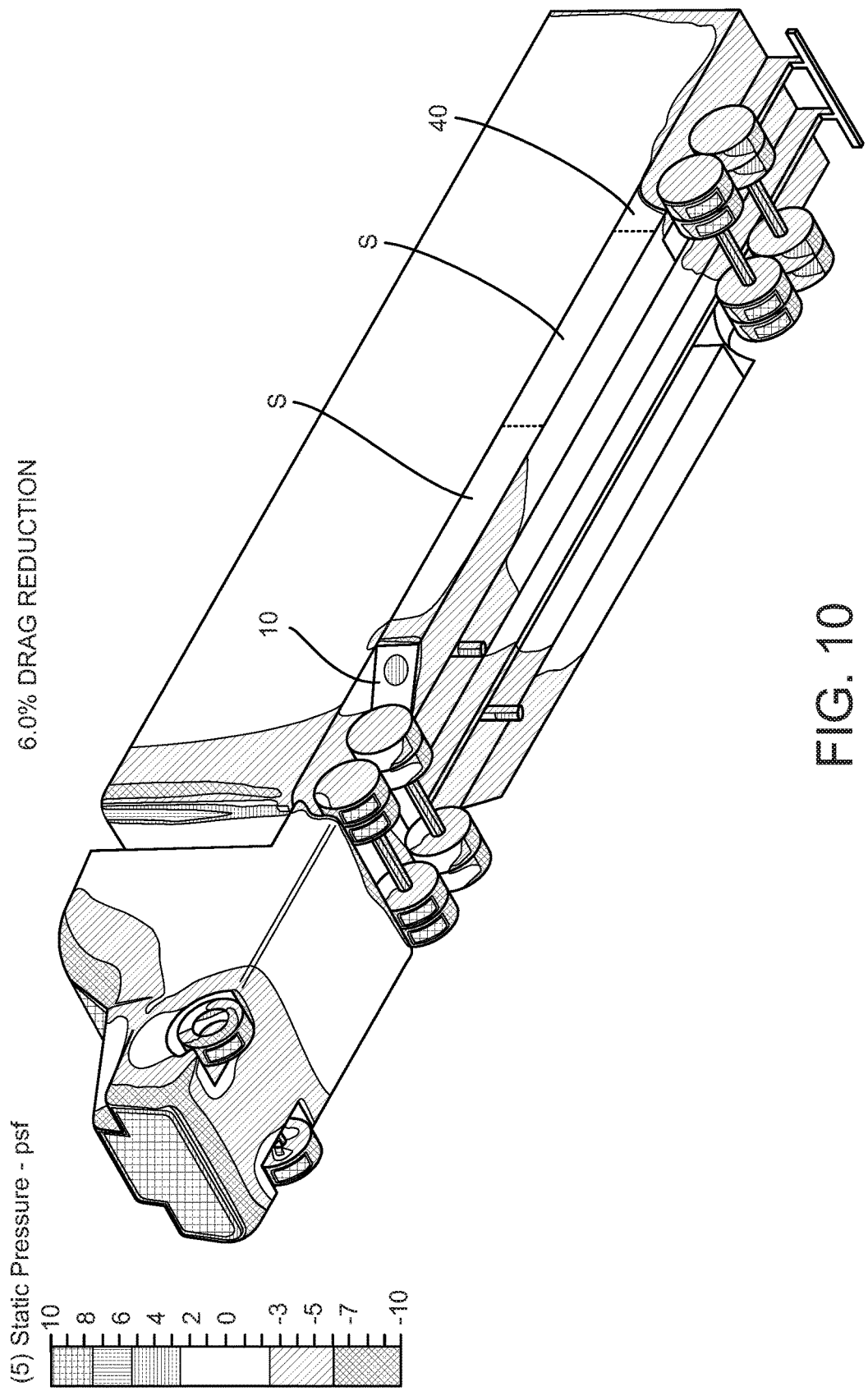
FIG. 10 is the three-dimensional CFD model of FIG. 6 with an aerodynamic cap and rear skin of the present disclosure added to the storage box, and with the storage box moved forward adjacent to the landing legs of the trailer.
Figure 11:
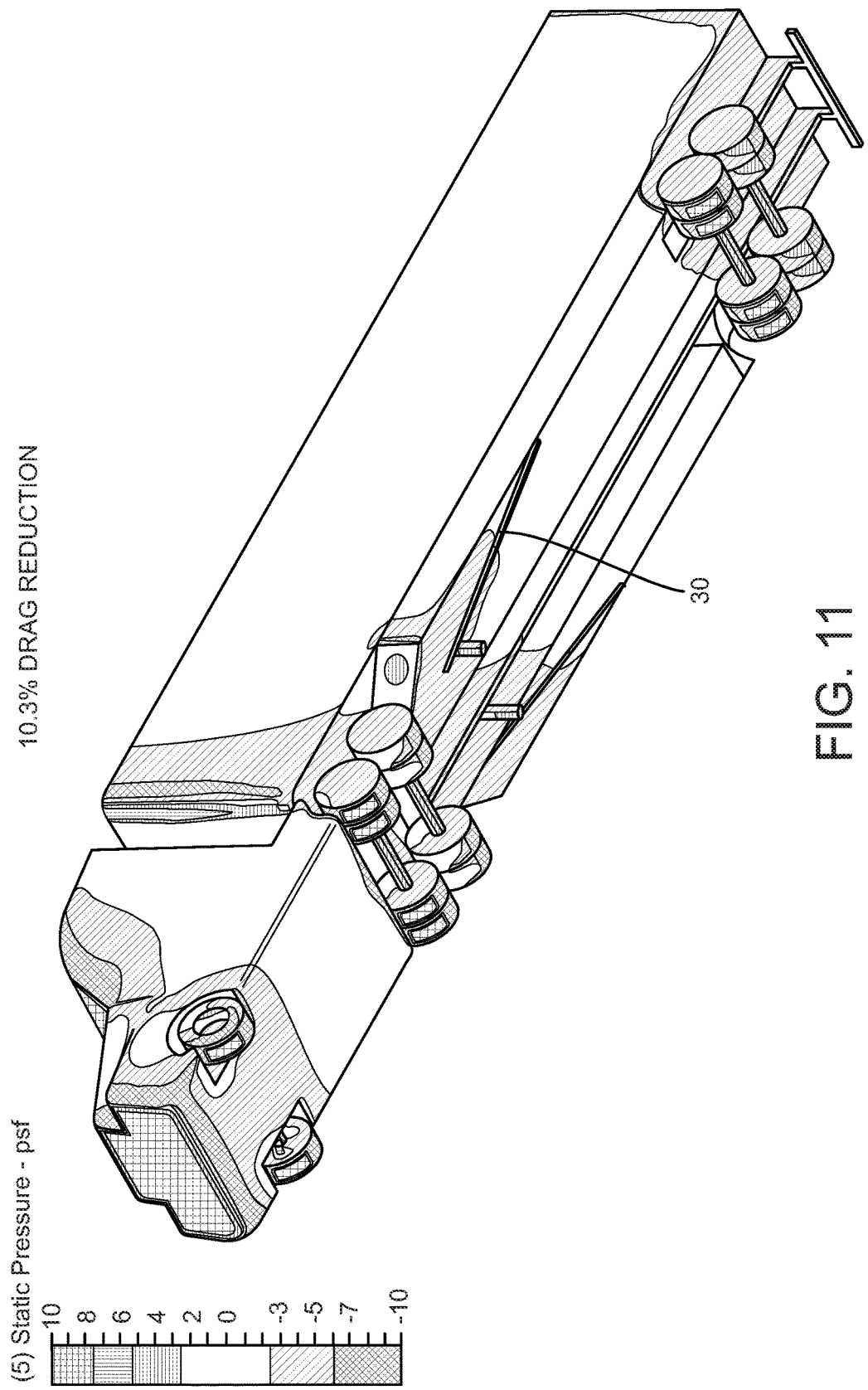
FIG. 11 is the three-dimensional CFD model of FIG. 6 with an aerodynamic cap and rear skin of the present disclosure added to the storage box, and with the storage box moved forward adjacent to the landing legs of the trailer as in FIG. 10 with the addition of the strake according to the present disclosure.

When the storage box is moved forward and the skin 40 extended back to the wheels W, as shown in FIG. 10, the drag reduction is 6%. It can be appreciated that rather than extending the skin from a single storage box at the front of the trailer, a second storage box can be added. Adding a strake 30, as shown in FIG. 11, produces an even greater drag reduction at 10.3% over the baseline configuration.

Figure 12:
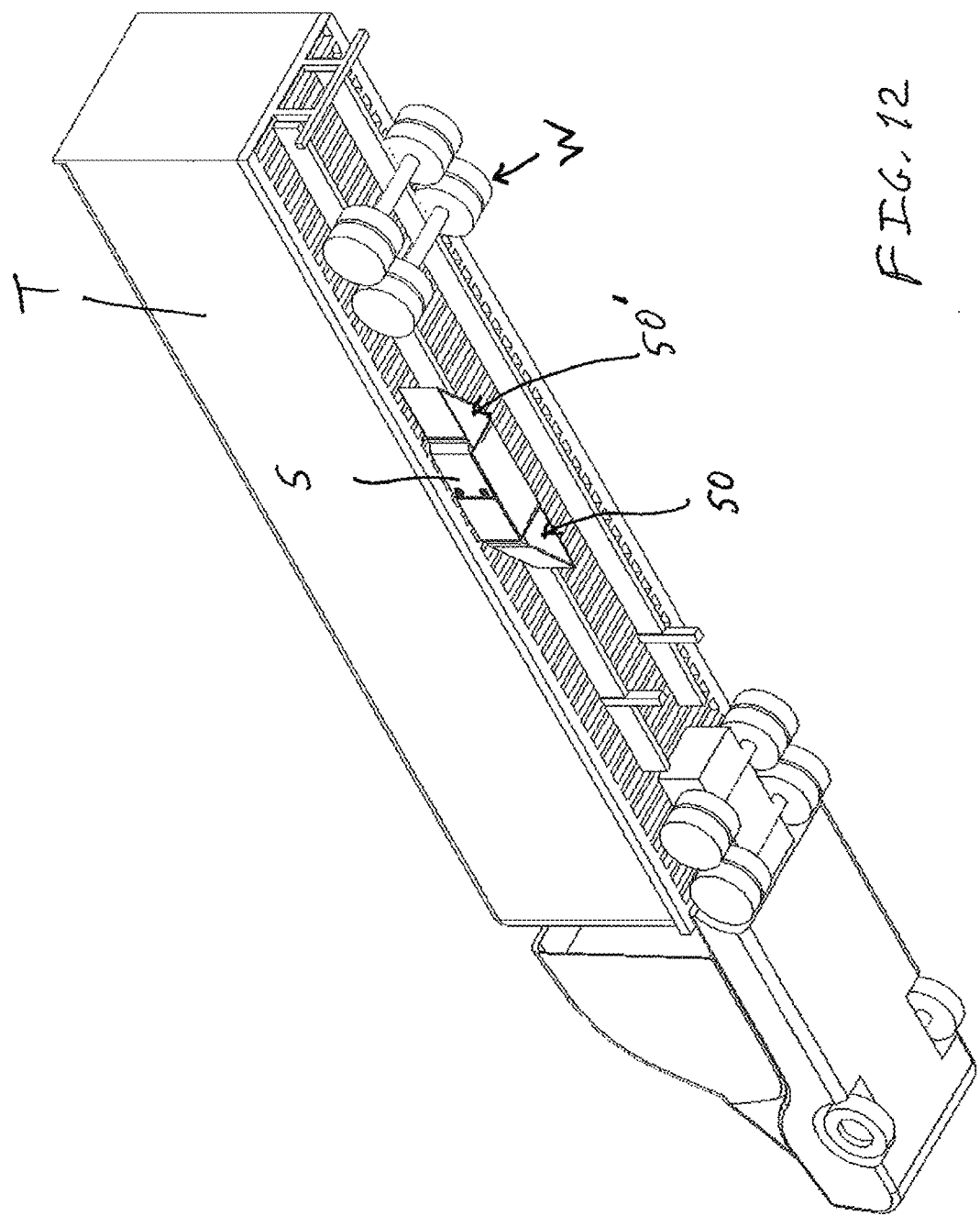
FIG. 12 is a perspective view of the underside of a trailer with an aerodynamic cap at each end of an underbody storage box according to a further embodiment.
Figure 13:
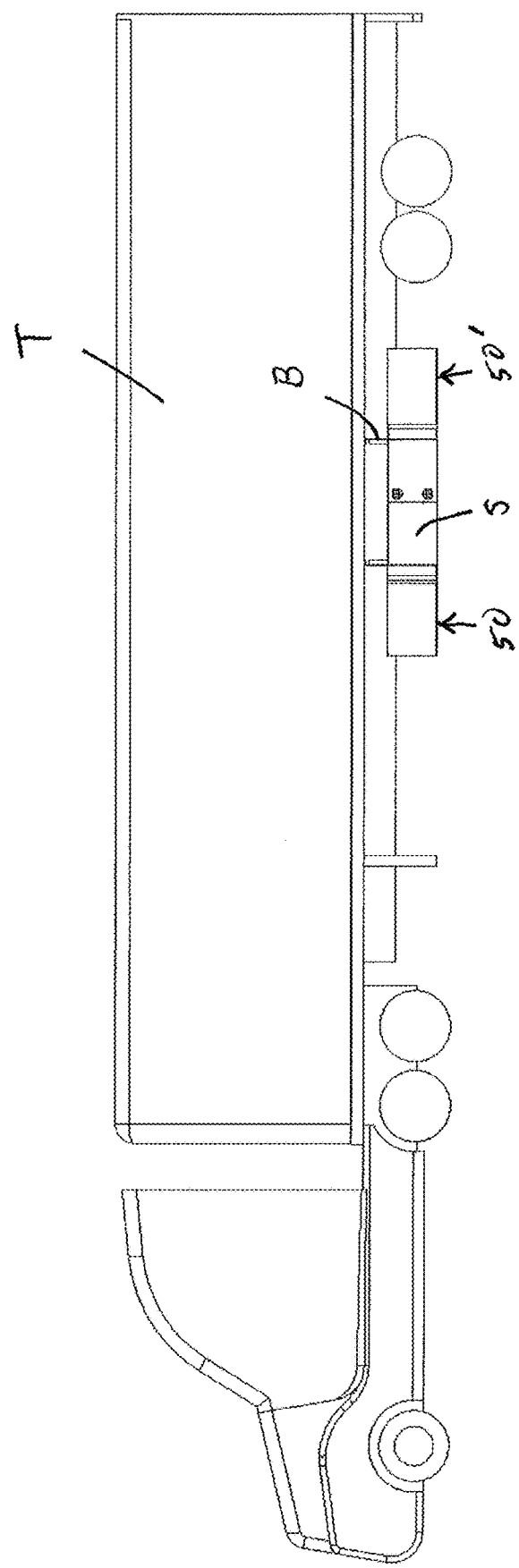
FIG. 13 is a side view of the storage box and aerodynamic caps shown in FIG. 12.
Figure 14:
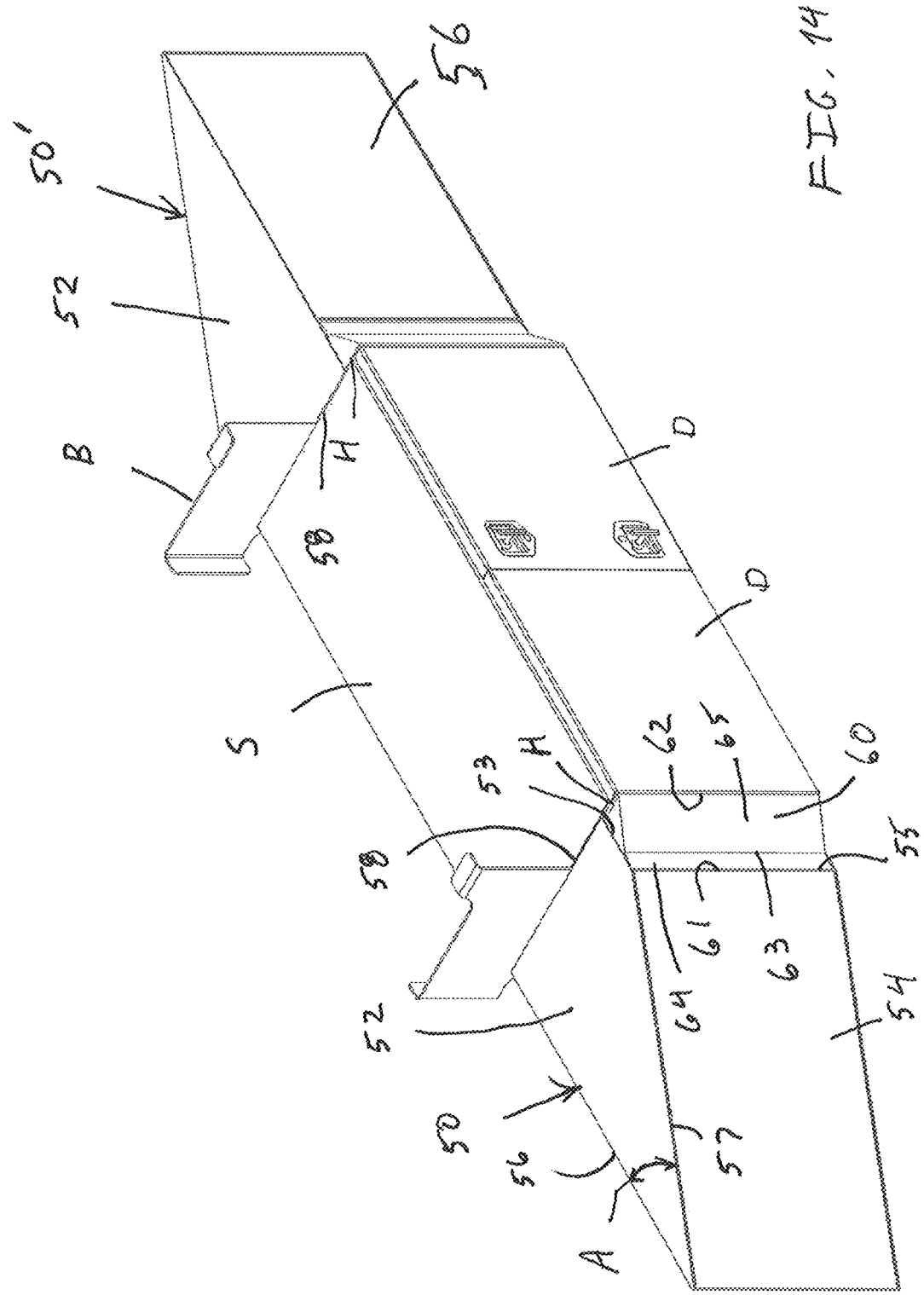
FIG. 14 is a perspective view of the storage box and aerodynamic caps apart from the trailer.

In another embodiment, shown in FIGS. 12-14, a pair of aerodynamic caps 50, 50' is mounted to the leading and trailing ends of a storage box S on a trailer T, as in the previous embodiment, except that the trailing cap 50' is oriented differently than the trailing cap 20 shown in FIG. 3. As in the previous embodiment, the two caps 50, 50' are identically constructed, each including a front panel 54, side panels 52, a base panel 56 and a rear panel 58. The front panel is oriented at an angle A relative to the base panel 56, which angle can be about 35° as in the previous embodiment. The rear panel 58 is at substantially a right angle to the base panel 56 and the front edge 57 of the opposing side panels 52 are defined at the angle A, with the front panel 54 connected to the side panels at the front edge.

Figure 17:
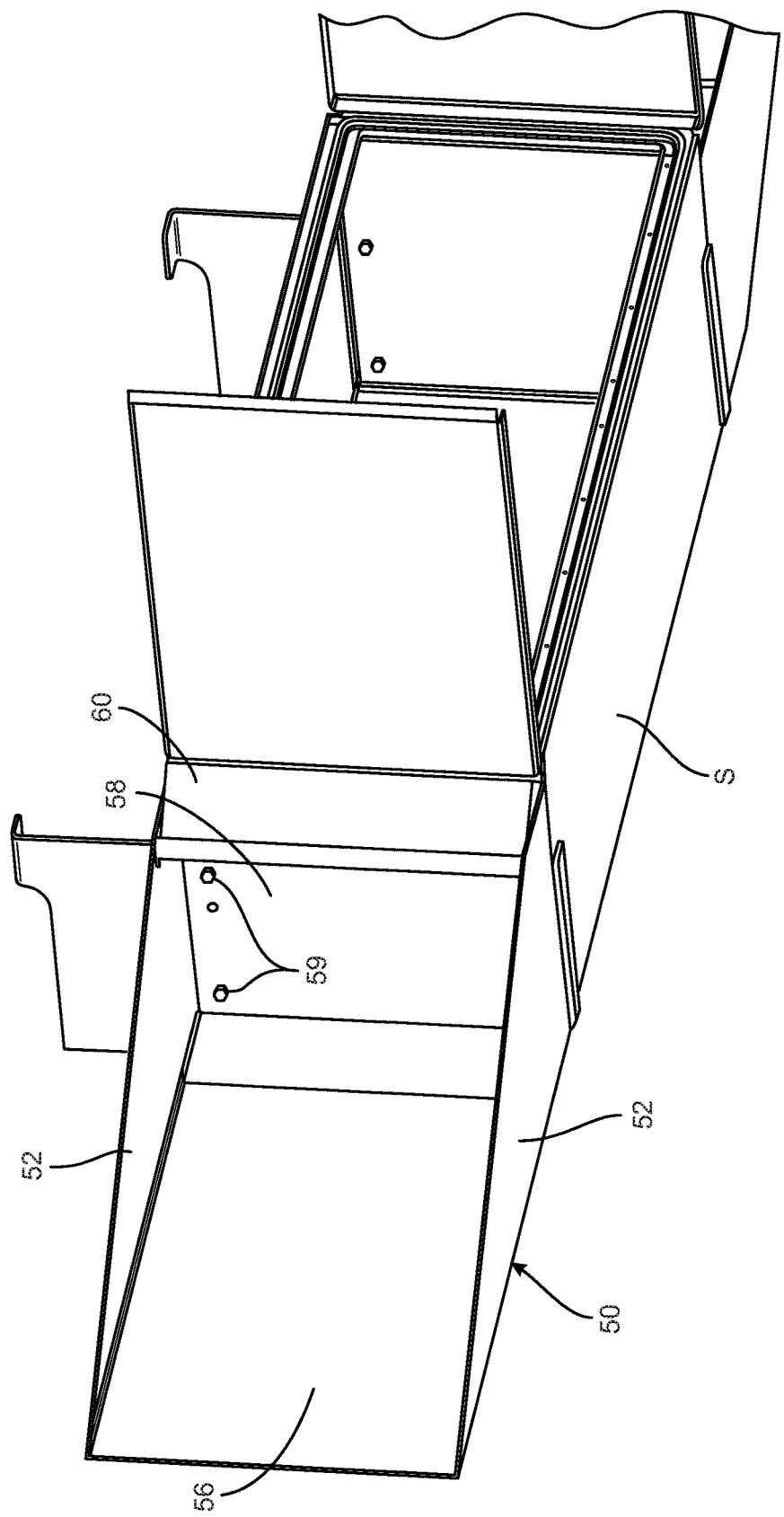
FIG. 17 is a perspective view of the storage box and aerodynamic cap shown in FIG. 14, with the front panel of the aerodynamic cap removed.

The rear panel 58 may be used to affix the cap 50 to the storage box S, as depicted in FIG. 17. In particular, the rear panel 58 maybe bolted directly to the end wall of the storage box. Alternatively, the rear panel 58 may be eliminated, as in the aerodynamic cap 10 shown in FIG. 5, with the cap mounted to the storage box by brackets.

As shown in FIGS. 12 and 14, the trailing cap 50' is oriented so that the base panel 56 faces outward, rather than inward as with the leading cap 50. The base panel 56 of the trailing cap 50' thus provides a continuation surface relative to the storage box S. The airflow is thus directed by the angled front panel 54 of the leading cap 50, follows the face of the storage box S and continues along the base panel 56 of the trailing cap 50' to flow over the rear wheels W of the trailer. This arrangement of the trailing aerodynamic cap 50' thus reduces aerodynamic drag caused by the rear wheels of the trailer.

Figure 16:
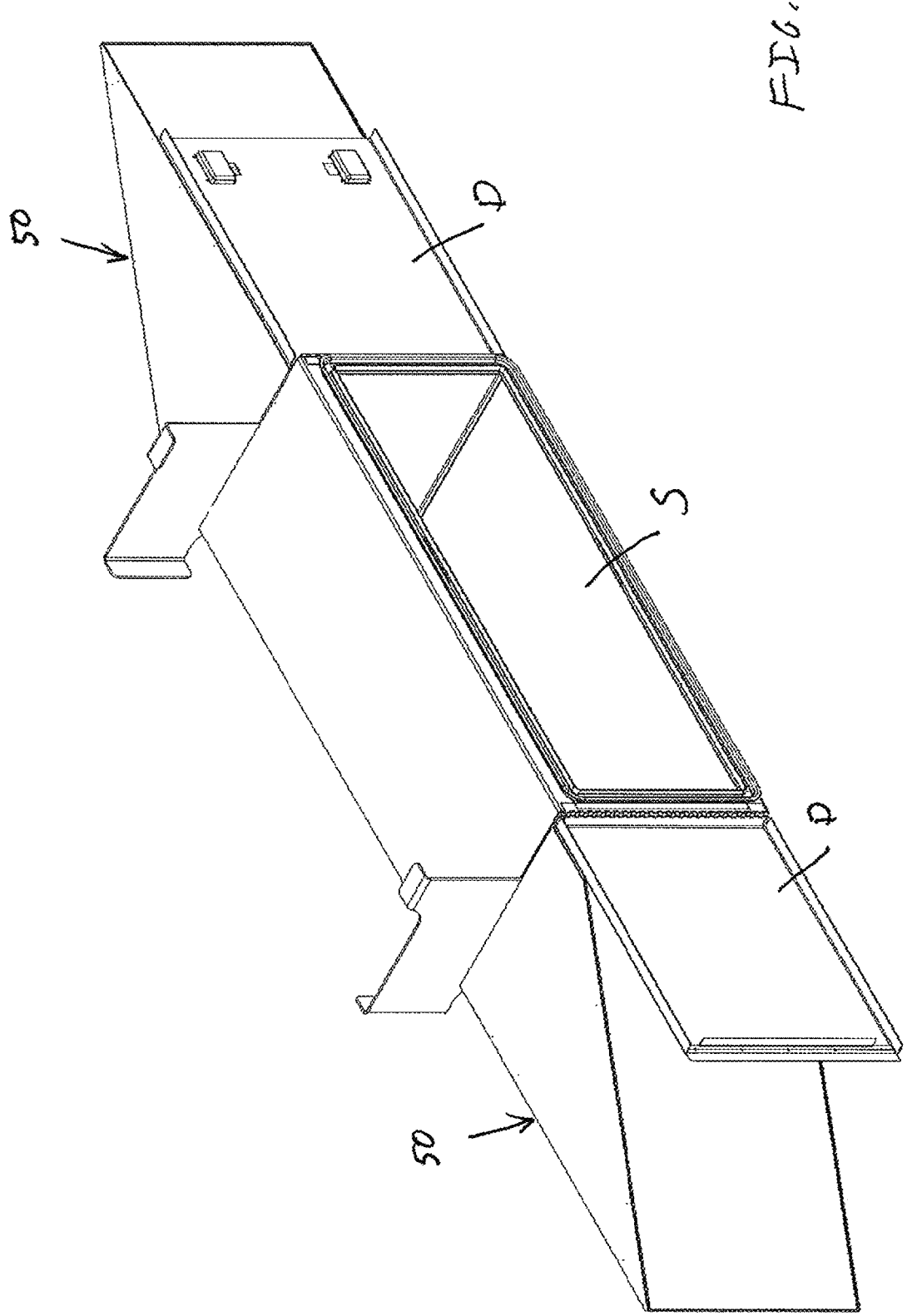
FIG. 16 is a perspective view of the storage box and aerodynamic caps shown in FIG. 14, with the storage box doors fully opened.

Returning to FIG. 14, the profile of the caps 50, 50' are modified relative to the caps 10, 20 in the previous embodiment. In particular, the front panel 54 terminates at a trailing edge and the side panels 52 terminate at truncated edges 53, in essence removing the apex of the triangular shape of the side panels. The typical storage box S includes a pair of doors D that swing outward from hinges H. Due to the configuration of the doors and their hinges, the doors can swing through 180° so that in their fully open position, shown in FIG. 16, the doors extend essentially straight across the storage box. In this case, the doors would otherwise contact the trailing edge of the front panel. Thus, in the caps 50, 50' the front panel 54 terminates at a trailing edge 61 and the side panels 52 terminate at truncated edges 53, in essence removing the apex of the triangular shape of the side panels. This truncated apex thus provides space for the doors D to be fully opened, as in FIG. 16.

Figure 15:
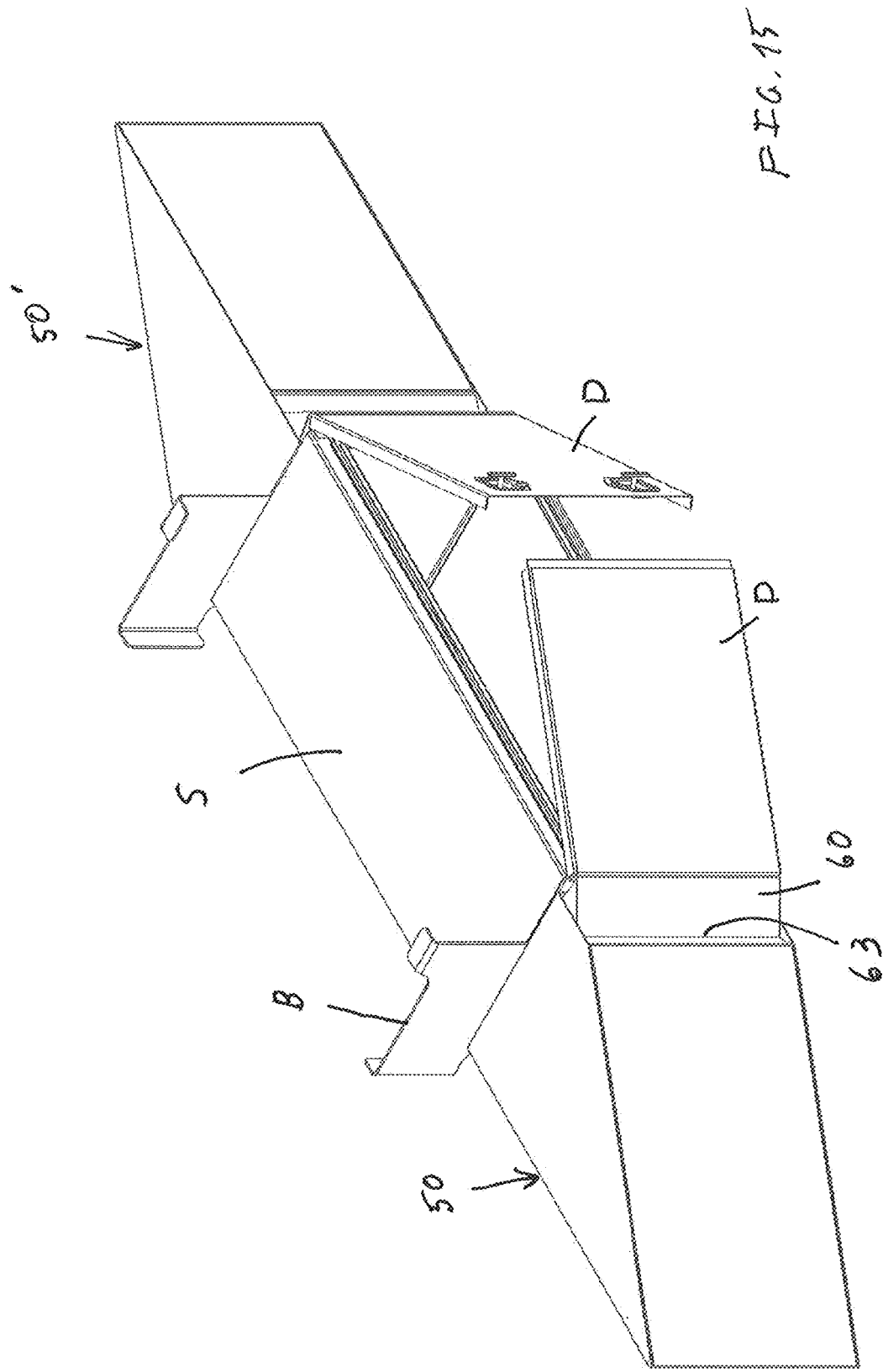
FIG. 15 is a perspective view of the storage box and aerodynamic caps shown in FIG. 14, with the storage box doors partially opened.

Since the angled flow directing surface of the front panel 54 is interrupted, the aerodynamic cap 50 is provided with a component 60 to span the gap between the trailing edge 63 and the side of the door D of the storage box S. In one embodiment, the component 60 can be a flexible skirt that is affixed to the front panel edge 63 and to door D at edge 62. In another embodiment, the component 60 is a living hinge with one hinge panel 64 fastened to trailing edge 63 and another hinge panel 65 affixed to the edge 62 of the door D. The two hinge panels 64, 65 are connected at a joint 63. The living hinge component 60 is formed of a stiff but bendable material so that as the door D is opened, as shown in FIG. 15, the hinge panels flex at the joint 63, as well as the edges 61, 62. As the living hinge flexes the panels move inward into the cap 50, making room for the door D when it reaches its fully opened position shown in FIG. 16. The component 60 is configured to substantially follow the plane of the front panel 54 when the doors D of the storage box are closed, as in FIG. 14, so that the component continues the aerodynamic drag reduction effect of the front panel. In certain embodiments, the component may not be exactly co-planar with the front panel buy nevertheless the component will define a smooth aerodynamic transition from the front panel to the storage box door. The component can be deformed when the doors are open since the vehicle is not moving at that time.

In a further feature, the aerodynamic caps 50, 50' may be augmented by an additional fairing 70 mounted to the upper side panels 52 of the caps, as shown in FIG. 18. The fairing 70 includes a leading panel 72 that is arranged at an angle that is preferably parallel to the angle of the front panel 52. The fairing 70 further includes a trailing panel 74 that extends parallel to the trailer to help direct airflow across the rear of the trailer.

The fairing may be affixed to the mounting brackets B used to mount the storage box S to the vehicle, as shown in FIG. 18. Moreover, the fairing 70 is preferably fastened to the aerodynamic caps 50, 50' at the opposite ends of the storage box. The fairing thus not only serves to direct airflow, but also serves to support the aerodynamic caps that are essentially cantilevered from the ends of the storage box. The fairing 70 may thus incorporate a flange 78 that enables attachment to the corresponding caps 50, 50' in a conventional manner, either by welding or my mechanical fastener. It is contemplated that the cantilevered caps may be fastened to the storage box by a cantilevered plate, in lieu of the fairing, that is fastened to the storage box and fairing.

The present disclosure should be considered as illustrative and not restrictive in character. It is understood that only certain embodiments have been presented and that all changes, modifications and further applications that come within the spirit of the disclosure are desired to be protected.

What is claimed is:

1. An underbody storage box assembly mountable beneath a vehicle body, the assembly comprising:
    a storage box mountable to the underbody of the vehicle body, the storage box having a leading face and a trailing face in the direction of travel of the vehicle;
    a pair of aerodynamic caps, one mounted at the leading face of said storage box and the other mounted at the trailing face of said storage box, each of said aerodynamic caps having substantially the same construction including:
    opposite side panels, each having a substantially triangular shape with a rear edge abutting said storage box, a base edge that is substantially perpendicular to said rear edge, and a front edge that is arranged at an acute angle relative to the base edge; and
    a front panel connected between said opposite side panels at said front edge.

2. The underbody storage box assembly of claim 1, wherein said acute angle is between 20-60 degrees.

3. The underbody storage box assembly of claim 1, wherein said aerodynamic caps each include a transition panel between said front panel and said rear edge, the transition panel being non-planar relative to the front panel.

4. The underbody storage box assembly of claim 3, wherein the transition panel is curved.

5. The underbody storage box assembly of claim 1, wherein one of said aerodynamic caps is mounted at the leading face of the storage box with the front panel facing toward the front of the vehicle and the other of said aerodynamic caps is mounted at the trailing face of the storage box with the front panel facing toward the rear of the vehicle when the storage box is mounted to the vehicle.

6. The underbody storage box assembly of claim 5, wherein the aerodynamic cap mounted at the trailing face of the storage box is mounted with the front panel facing downward relative to the vehicle.

7. The underbody storage box assembly of claim 5, wherein the aerodynamic cap mounted at the leading face of the storage box is mounted with the front panel facing laterally outward relative to the vehicle.

8. The underbody storage box assembly of claim 7, wherein the aerodynamic cap mounted at the trailing face of the storage box is mounted with the front panel facing laterally inward relative to the vehicle.

9. The underbody storage box assembly of claim 8, wherein each of said aerodynamic caps includes a base panel connected between said opposite panels at said base edge, and the aerodynamic cap mounted at the trailing face of said storage box is mounted with said base panel facing laterally outward relative to the vehicle.

10. The underbody storage box assembly of claim 1, further comprising a strake affixed to a bottom surface of the storage box, said strake arranged at an angle relative to the direction of travel of the vehicle when the storage box is mounted to the vehicle.

11. The underbody storage box assembly of claim 1, wherein each of said aerodynamic caps includes a base panel connected between said opposite panels at said base edge.

12. The underbody storage box assembly of claim 1, wherein:
    said storage box includes a pair of hinged doors configured to open laterally outward relative to the vehicle when the storage box is mounted thereon; and
    each of said aerodynamic caps includes a component mounted between a corresponding one of said doors and an edge of said front panel closest to said rear edge of said side panels, said component configured to provide an aerodynamic transition from said front panel to the doors when the doors are closed and to deform as the doors are opened.

13. The underbody storage box assembly of claim 12, wherein said component includes a living hinge.

14. The underbody storage box assembly of claim 12, wherein the substantially triangular shape of said opposite side panels of each aerodynamic cap is truncated at a corresponding door to provide clearance for the doors to open substantially 180° from their closed position.

15. The underbody storage box assembly of claim 1, further comprising a fairing mounted across the upper surface of the storage box and spanning from a side panel of the aerodynamic cap mounted at the leading face of the storage box to a side panel of the aerodynamic cap mounted at the trailing face of the storage box.

16. The underbody storage box assembly of claim 15, wherein the fairing includes:
    a first portion mounted to the side panel of said aerodynamic cap mounted at the leading face of the storage box, said first portion arranged substantially parallel to said front panel of said aerodynamic cap; and
    a second portion extending from said first portion to the side panel of the aerodynamic cap mounted at the trailing face of the storage box, said second portion arranged substantially parallel to the direction of travel of the vehicle.

17. An aerodynamic cap for mounting to the leading and trailing faces of an underbody storage box assembly mountable beneath a vehicle body, the cap comprising:
    opposite side panels, each having a substantially triangular shape with a rear edge for abutting the storage box when mounted thereto, a base edge that is substantially perpendicular to said rear edge, and a front edge that is arranged at an acute angle relative to the base edge; and
    a front panel connected between said opposite side panels at said front edge.

18. The underbody storage box assembly of claim 1, wherein said acute angle is between 20-60 degrees.

19. The underbody storage box assembly of claim 17, wherein each of said aerodynamic caps includes a base panel connected between said opposite panels at said base edge.

20. The underbody storage box assembly of claim 17, in which the storage box includes a pair of hinged doors configured to open laterally outward relative to the vehicle when the storage box is mounted thereon, said aerodynamic cap further comprising a component mounted at an edge of said front panel closest to said rear edge of said side panels and configured to be mounted to one of the hinged doors, said component configured to be substantially coplanar with said front panel when the doors are closed and to deform as the doors are opened.

21. The underbody storage box assembly of claim 12, wherein said component includes a living hinge.

22. The underbody storage box assembly of claim 20, wherein the substantially triangular shape of said opposite side panels of said aerodynamic cap is truncated at the door to provide clearance for the door to open substantially 180° from its closed position.

23. An underbody storage box assembly mountable beneath a vehicle body, the assembly comprising:
   a storage box mountable to the underbody of the vehicle body, the storage box having a leading face and a trailing face in the direction of travel of the vehicle;
   an aerodynamic cap mounted at the leading face of said storage box and including:
   opposite side panels, each having a substantially triangular shape with a rear edge abutting said storage box, a base edge that is substantially perpendicular to said rear edge, and a front edge that is arranged at an acute angle relative to the base edge; and
   a front panel connected between said opposite side panels at said front edge.

24. The underbody storage box assembly of claim 23, wherein said acute angle is between 20-60 degrees.

25. The underbody storage box assembly of claim 23, wherein said aerodynamic cap includes a transition panel between said front panel and said rear edge, the transition panel being non-planar relative to the front panel.

26. The underbody storage box assembly of claim 23, wherein the aerodynamic cap is mounted with the front panel facing laterally outward relative to the vehicle.

27. The underbody storage box assembly of claim 23, further comprising a strake affixed to a bottom surface of the storage box, said strake arranged at an angle relative to the direction of travel of the vehicle when the storage box is mounted to the vehicle.

28. The underbody storage box assembly of claim 23, wherein each of said aerodynamic caps includes a base panel connected between said opposite panels at said base edge.

29. The underbody storage box assembly of claim 23, wherein:
   said storage box includes a pair of hinged doors configured to open laterally outward relative to the vehicle when the storage box is mounted thereon; and
   said aerodynamic cap includes a component mounted between a front one of said doors and an edge of said front panel closest to said rear edge of said side panels, said component configured to provide an aerodynamic transition from said front panel to the front one of said doors when the front one of said doors is closed and to deform as the front one of said doors is opened.

30. The underbody storage box assembly of claim 29, wherein said component includes a living hinge.

31. The underbody storage box assembly of claim 29, wherein the substantially triangular shape of said opposite side panels of said aerodynamic cap is truncated at the front one of said door to provide clearance for the front one of said doors to open substantially 180° from its closed position.

* * * * *